April 26, 1927.                    M. KOSKE                    1,626,415
                    COMBINATION BRUSH, COMB, AND MIRROR
                           Filed June 7, 1926
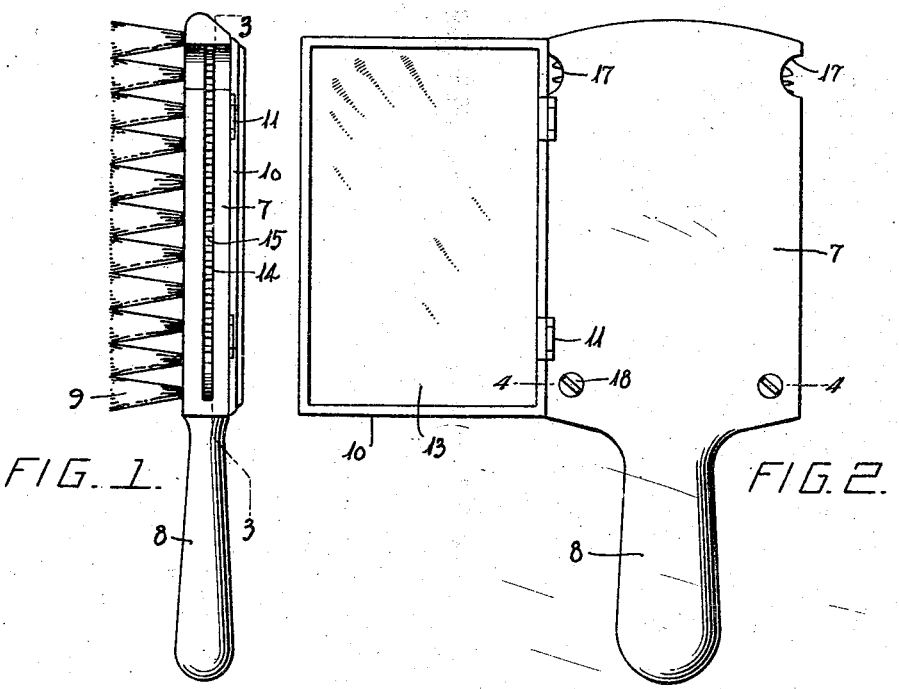
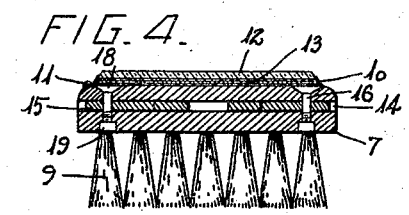
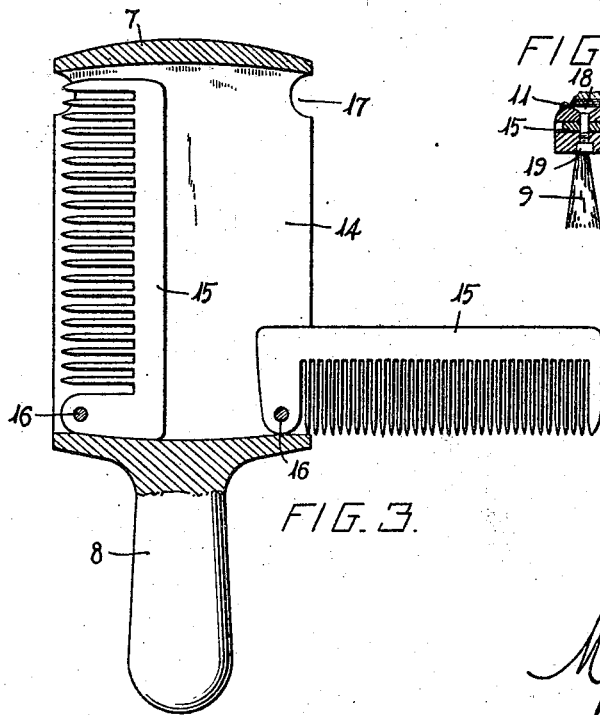
Inventor:
Mike Koske
By Monroe E. Miller
    Attorney.

Patented Apr. 26, 1927.

1,626,415

UNITED STATES PATENT OFFICE.

MIKE KOSKE, OF PROBERTA, CALIFORNIA.

COMBINATION BRUSH, COMB, AND MIRROR.

Application filed June 7, 1926. Serial No. 114,338.

The present invention relates to a combination brush, comb and mirror, and aims to provide a novel and improved device of that kind, including combs and a mirror combined with a hair brush in a novel manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved device.

Fig. 2 is a back view thereof showing the mirror swung open.

Fig. 3 is a section on the line 3—3 of Fig. 1, showing one comb swung outwardly to position for use.

Fig. 4 is a cross section on the line 4—4 of Fig. 2, with the mirror in closed position.

The body of the device comprises a hair brush having the back 7 with a handle 8 at one end and bristles 9 secured to or embedded in the back at one side thereof in any suitable manner. The back 7 and handle 8 may be of wood, hard rubber or any other suitable material.

A mirror frame 10 of sheet metal, wood or other suitable material, is hinged, as at 11, to the back 7 along one edge of the back, and has secured therein outer and inner mirrors 12 and 13, respectively. When the mirror frame 10 is swung against the back 7, opposite to the bristles 9, the mirror 12 is exposed and same is preferably a flat or plane mirror. When the mirror frame 10 is swung open the mirror 13 is exposed, and same is preferably a slightly concaved mirror in order that the entire face or head may be seen by reflection therein. By laying the brush down on a table with the bristles lowermost, the mirror frame 10 may be adjusted to different angles, in order that the face or head may be seen conveniently, such as when shaving. The hinges 11 are preferably friction hinges so as to hold the mirrors at any desired angle to the back 7, and, if desired, any suitable or well known means may be employed for holding the frame 10 against the back 7 when the mirror frame 10 is swung to closed position.

The back 7 is provided in a plane between the opposite sides thereof with a slot or opening 14 extending from one edge of the back to the other, to receive a pair of combs 15 which are pivoted, as at 16, to the back 7 within the slot 14 adjacent to the handle end of the back. The back 7 has finger notches 17 at its edges near the end of the back opposite to the handle, in order that the free ends of the combs may be taken hold of by the thumb and finger for swinging the combs out of the slot 14. The combs 15 are engaged frictionally with the back 7 so as to remain in the different positions to which the combs are swung unless force is applied sufficiently to overcome the friction. Thus, the pivots 16 are bolts or screws having the countersunk slotted heads 18 which may be engaged by a screw-driver for rotating said screws, and the screws may be threaded within that portion of the back 7 opposite to the mirrors, or nuts 19 may be embedded in that portion of the back at the side of the slot 14 opposite to the mirrors, in order that when the screws are tightened, the back 7 is compressed in order to clamp the combs in the back and produce the desired friction so that the combs will not swing too freely. The mirrors, when closed, cover and conceal the screw heads 18.

Either comb may be swung outwardly, it being preferable to have a fine comb and a coarse comb, as seen in Fig. 3. When a comb is swung outwardly it may be positioned at a right angle with the handle 8 or at other angles therewith, and the handle may be held in the hand for manipulating the comb, it being noted that the comb projects from the slot 14 adjacent to the handle, thereby facilitating the manipulation of the comb by the handle.

Having thus described the invention, what is claimed as new is:—

1. A device of the character described comprising a comb having a back with a handle and bristles, said back having a slot extending from one edge thereof to the opposite edge, and a pair of combs movable into and out of said slot at the opposite edges of the back and pivoted to said back adjacent to the handle.

2. A device of the character described comprising a brush having a back with a handle and bristles, said back having a slot, a comb movable into and out of said slot, a clamping screw engaged in the back and pivoting said comb to the back and adapted to frictionally clamp the comb in the back, and a mirror hingedly connected with the back to swing thereagainst opposite to the bristles and arranged to cover and conceal said screw.

In testimony whereof I hereunto affix my signature.

MIKE KOSKE.